(12) United States Patent
Kobayashi

(10) Patent No.: US 7,374,462 B2
(45) Date of Patent: May 20, 2008

(54) TERMINAL FOR ROTATING ARMATURE

(75) Inventor: Takayuki Kobayashi, Haga-gun (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 11/685,743

(22) Filed: Mar. 13, 2007

(65) Prior Publication Data
US 2008/0018193 A1    Jan. 24, 2008

(30) Foreign Application Priority Data
Jul. 21, 2006   (JP)   ............... 2006-199912

(51) Int. Cl.
*H01R 11/09*   (2006.01)
(52) U.S. Cl. .................. 439/723; 439/212; 310/71
(58) Field of Classification Search ........... 439/723, 439/724, 212, 721, 621; 310/71, 179
See application file for complete search history.

(56) References Cited

U.S. PATENT DOCUMENTS 5,795,193 A * 8/1998 Yang ............... 439/620.27
6,402,569 B1 * 6/2002 Spadoni et al. ........... 439/723
2007/0052307 A1 * 3/2007 Yoshida et al. ............ 310/71
2007/0270045 A1 * 11/2007 Korczynski et al. ....... 439/723

FOREIGN PATENT DOCUMENTS

JP        2001-25187        1/2001

* cited by examiner

*Primary Examiner*—Hien D. Vu
(74) *Attorney, Agent, or Firm*—Babcock IP, PLLC

(57) ABSTRACT

In a terminal for a rotating armature, each of bus rings (A-C) is structured such that each of ring main bodies is formed as a plate shape included in a plane orthogonal to an axial direction thereof, and has a plate-shaped piece folded in a direction along the axial direction from one end in a peripheral direction of each of the ring main bodies, the plate-shaped piece of each of the bus rings (A-C) protrudes from a resin portion, and a leading end side portion of the plate-shaped piece is formed as a weld connection portion to each of connection terminals of a coupler.

15 Claims, 13 Drawing Sheets

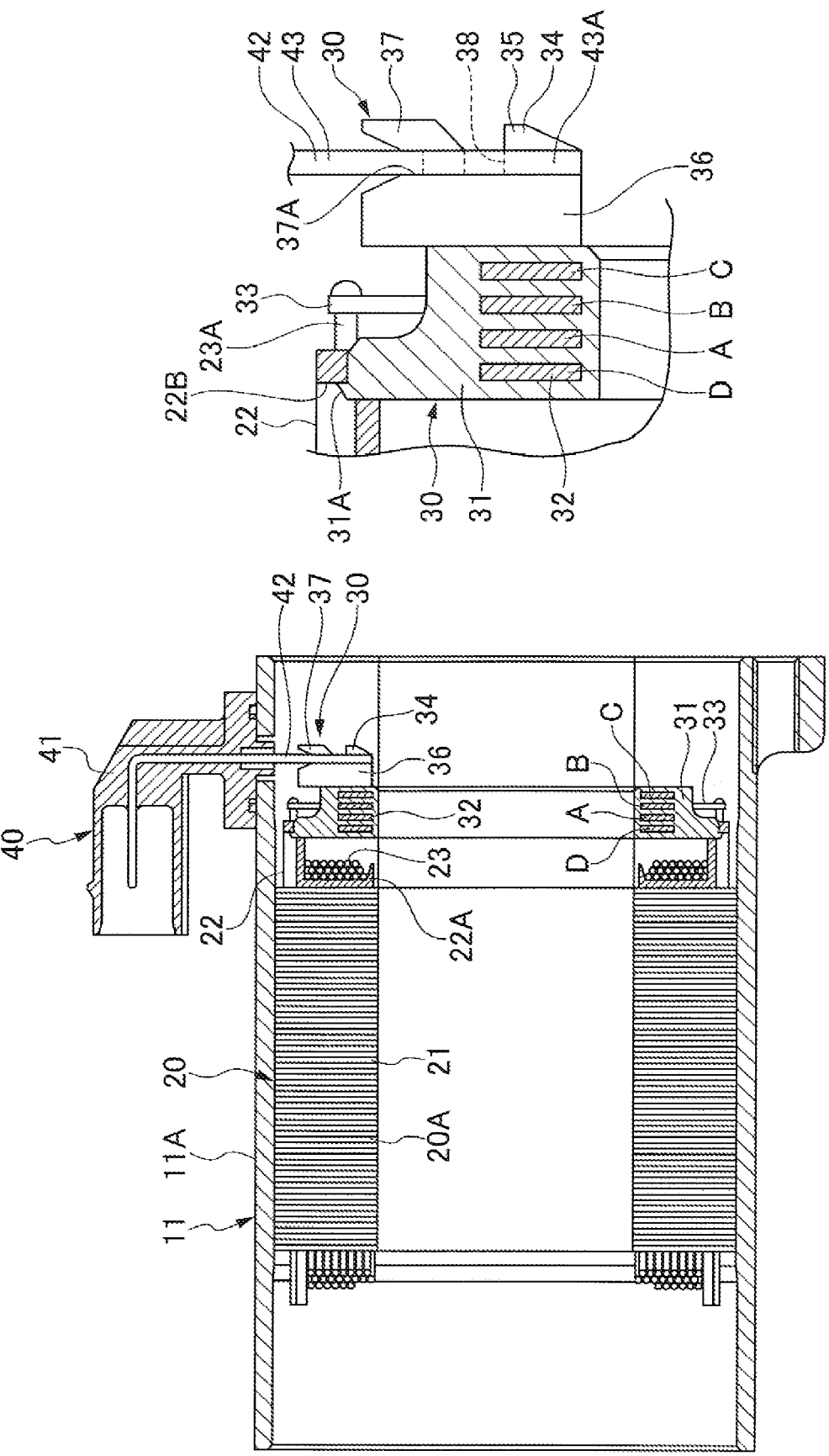

TERMINAL FOR ROTATING ARMATURE

BACKGROUND OF THE INVENTION

1. Field of the Invention

The present invention relates to a terminal for a rotating armature.

2. Description of the Related Art

In a conventional rotating armature, as described in Japanese patent Application Laid-open No. 2001-25187 (patent document 1), a stator is stored in a housing, resin bobbins are attached to a plurality of cores constituting the stator, respective U-phase, V-phase and W-phase coils are wound around a coil winding portion of the bobbins. A resin portion of a terminal is integrally formed by resin molding respective ring main bodies of three bus rings A to C and a neutral bus ring D that are attached to the resin bobbin of the stator. Further, the bus rings A to C of the terminal are respectively connected to the U-phase, V-phase and W-phase coil terminals of the stator, the neutral bus ring D is connected to common terminals of the respective coils, the coils are star connected, and respective U-phase, V-phase and W-phase connection terminals of a coupler are attached to a housing connected to a connection portion connected to the ring main bodies of the bus rings A to C of the terminal and protruding from the resin portion. The connection between the respective connection terminal of the coupler and the connection portion of the respective bus rings may be achieved by a welding in addition to a bolt fastening.

FIG. 13A shows a bus ring A in accordance with a conventional structure, and FIG. 13B shows a terminal 1. The terminal 1 is structured such that ring main bodies 2 of the respective bus rings A to D are arranged in parallel in an axial direction thereof so as to be resin molded to a resin portion 1A. In each of the bus rings A to D, a terminal portion 3 to which a coil terminal of each of the motor coils is connected is protruded to an outer side in a radial direction from an outer periphery of the resin portion 1A. In each of the respective bus rings A to C, a connection portion 4 welded to each of the connection terminals of the coupler is protruded to an outer side in an axial direction from a side portion of the resin portion LA. At this time, each of the bus rings A to C has an L-shaped plate-like piece 2A formed by including the ring main body 2 as a plate shape included in a plane orthogonal to an axial direction thereof, bending in an axial direction from a part of an inner periphery of the ring main body 2 and bent to an outer side in a radial direction, the L-shaped plate-like piece 2A is protruded from the resin portion 1A, and a leading end side portion of the L-shaped plate-like piece 2A is formed as the weld connection portion 4.

However, in the terminal 1, since a bent portion in the leading end side of the L-shaped plate-like piece 2A in each of the bus rings A to C is bent to the outer side in the radial direction, a complicated bending procedure is necessary, and it is necessary to form any slide metal mold 5 orthogonal to a dividing direction between the bent portion along the radial direction in the leading end side of the L-shaped plate-like piece 2A in the bus rings A to C and the resin portion 1A, at a time of arranging so as to insert the bus rings A to D within the metal mold, thereby insert molding, and intending to divide the metal mold along an axial direction P. Accordingly, an insert mold characteristic of the bus rings A to D is bad in addition to a bending formability of the connection terminal of the bus ring.

SUMMARY OF THE INVENTION

An object of the present invention is to improve a bending formability of a connection terminal of a bus ring, and to improve an insert mold formability of the bus ring, in a terminal for a rotating armature.

The present invention relates to a terminal for a rotating armature. Ring main bodies of bus rings (A-C) respectively are connected to U-phase, V-phase and W-phase coils of a stator, and a neutral bus ring (D) connected to common terminals of the respective coils, are arranged in parallel in an axial direction thereof to be resin molded in a resin portion. A connection portion of the bus rings (A-C) welded to the respective U-phase, V-phase and W-phase connection terminals of a coupler, is protruded from the resin portion. Each of the bus rings (A-C) formed as a plate shape in which a ring main body of each bus ring is included in a plane orthogonal to the axial direction. A plate-shaped piece is bent in a direction along the axial direction from one end in a peripheral direction of each of the ring main bodies. The plate-shaped piece of each of the bus rings (A-C) is protruding from the resin portion. A leading end side portion of the plate-shaped piece is formed as a connection portion to each of the connection terminals of the coupler.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 2A and 2B show a stator assembly, in which FIG. 2A is a cross sectional view and FIG. 2B is an enlarged view of a main portion;

FIGS. 3A and 3B show the stator assembly, in which FIG. 3A is a front elevational view and FIG. 3B is an enlarged view of the main portion;

FIGS. 4A and 4B show a sub assembly in which a terminal is attached to a stator, in which FIG. 4A is a cross sectional view and FIG. 4B is an enlarged view of a main portion;

FIGS. 5A and 5B show a core sub assembly, in which FIG. 5A is a cross sectional view along a line A-A in FIG. 5B, and FIG. 5B is an end elevational view.

FIGS. 6A to 6D show a terminal, in which FIG. 6A is a cross sectional view, FIG. 6B is a front elevational view, FIG. 6C is an enlarged view of a main portion of FIG. 6A, and FIG. 6D is an enlarged view of a main portion of FIG. 6B;

FIGS. 7A to 7C show a bus ring A, in which FIG. 7A is a front elevational view, FIG. 7B is a cross sectional view along a line B-B in FIG. 7A, and FIG. 7C is a plan view;

FIGS. 8A to 8C show a bus ring B, in which FIG. 8A is a front elevational view, FIG. 8B is a cross sectional view along a line B-B in FIG. 8A, and FIG. 8C is a plan view;

FIGS. 9A and 9B show a bus ring C, in which FIG. 9A is a front elevational view, and FIG. 9B is a cross sectional view along a line B-B in FIG. 9A;

FIGS. 10A and 10B show a bus ring D, in which FIG. 10A is a front elevational view, and FIG. 10B is a cross sectional view along a line B-B in FIG. 10A;

FIGS. 11A and 11B show a coupler, in which FIG. 11A is a cross sectional view and FIG. 11B is a front elevational view;

FIGS. 12A and 12B show a metal mold dividing direction of the bus ring and the terminal in accordance with the present invention, in which FIG. 12A is a perspective view and FIG. 12B is a side elevational view; and FIGS. 13A and 13B show a metal mold dividing direction of the bus ring and the terminal in accordance with the prior art, in which FIG. 13A is a perspective view and FIG. 13B is a side elevational view.

DESCRIPTION OF THE PREFERRED EMBODIMENTS

Figure 1:
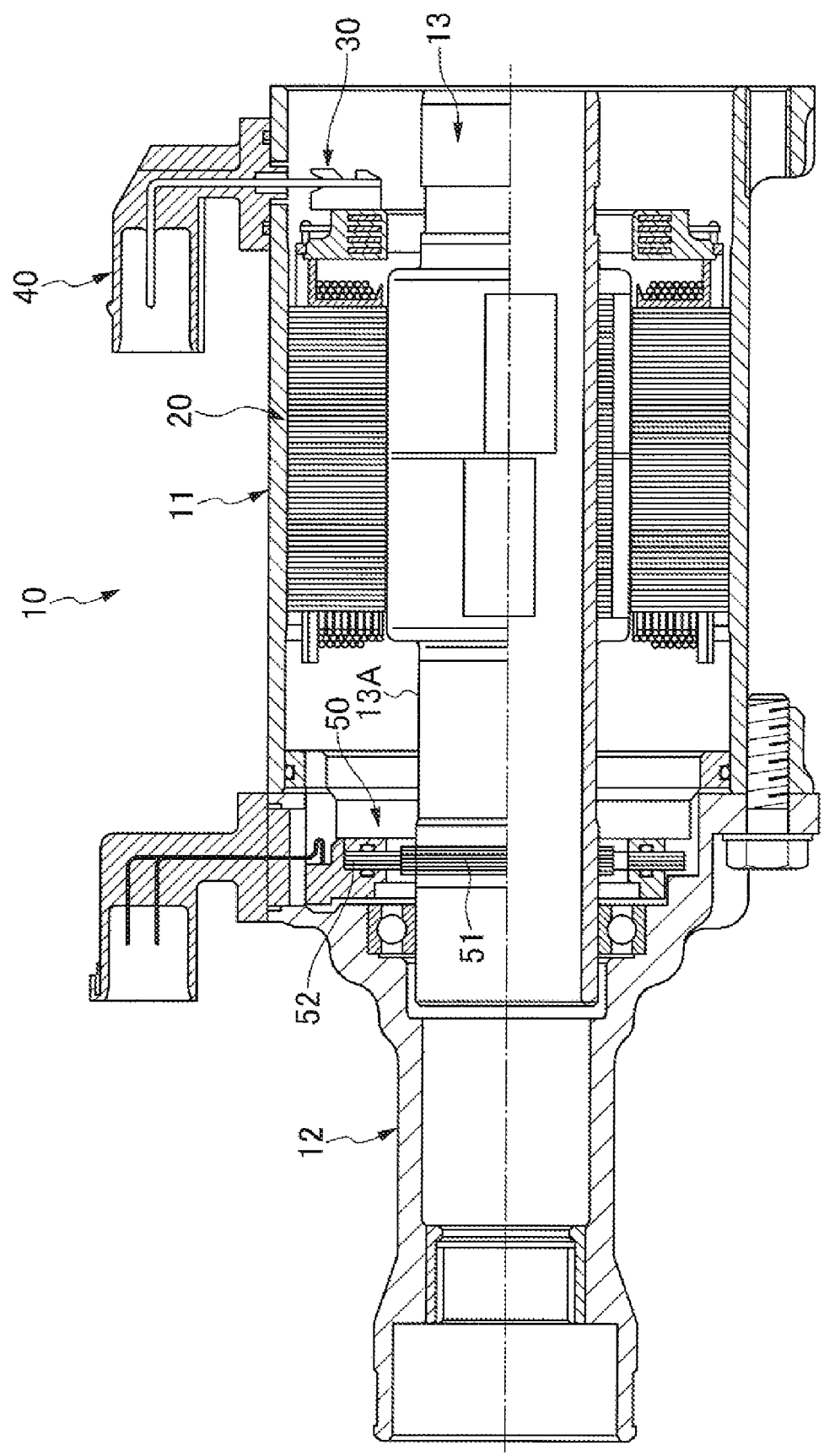
FIG. 1 is a cross sectional view showing a motor.
Figure 3A:
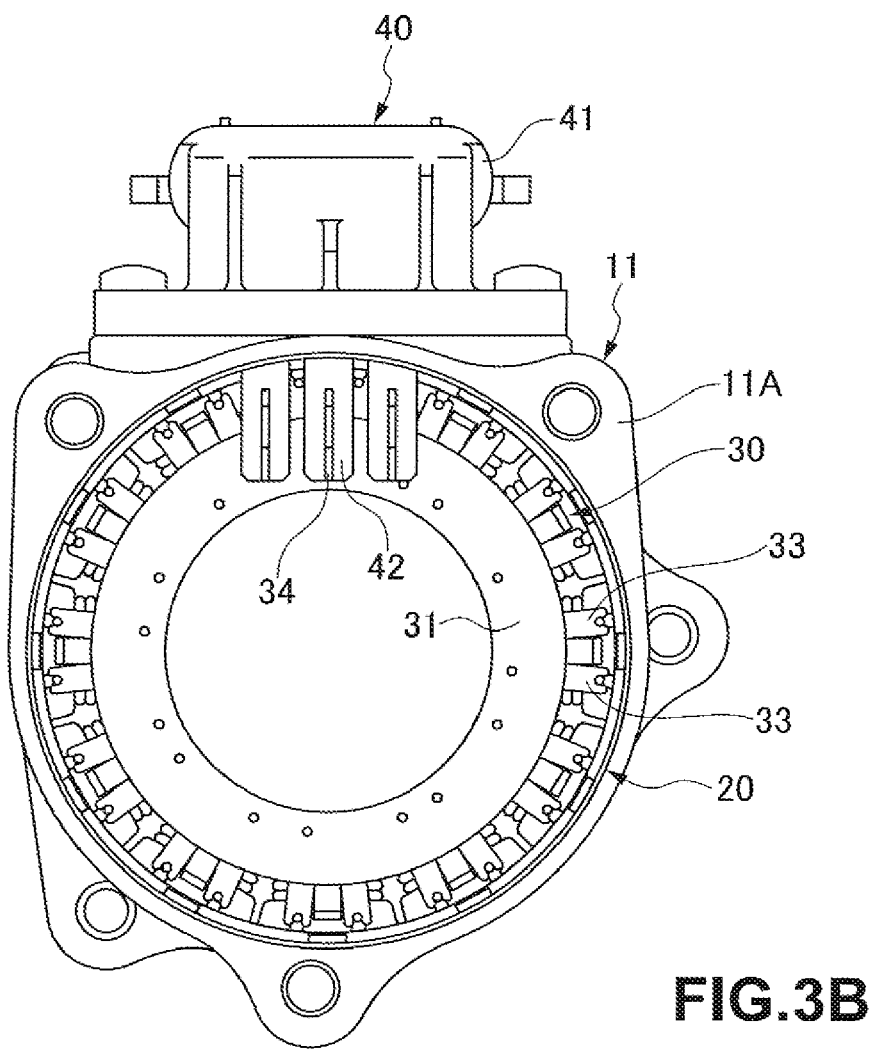
Figure 3B:
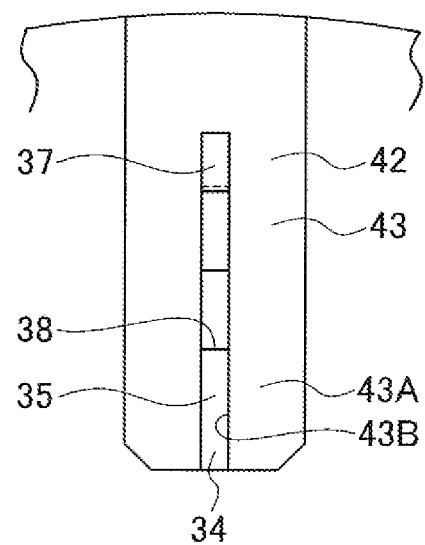

A DC brushless motor 10 corresponding to a rotating armature in accordance with the present invention is structured, as shown in FIG. 1, such that an end housing 12 is attached to one end of a stator assembly 11, and a rotor assembly 13 is rotatably supported to the stator assembly 11 and an inner portion of the end housing 12.

The stator assembly 11 is structured, as shown in FIGS. 2A to 3B, such that a sub assembly of a cylindrical stator 20 and a terminal 30 is stored in an inner periphery of a yoke integrally formed with the housing 11A and a coupler 40 attached to the housing 11A is connected to the terminal 30.

Figure 4A:
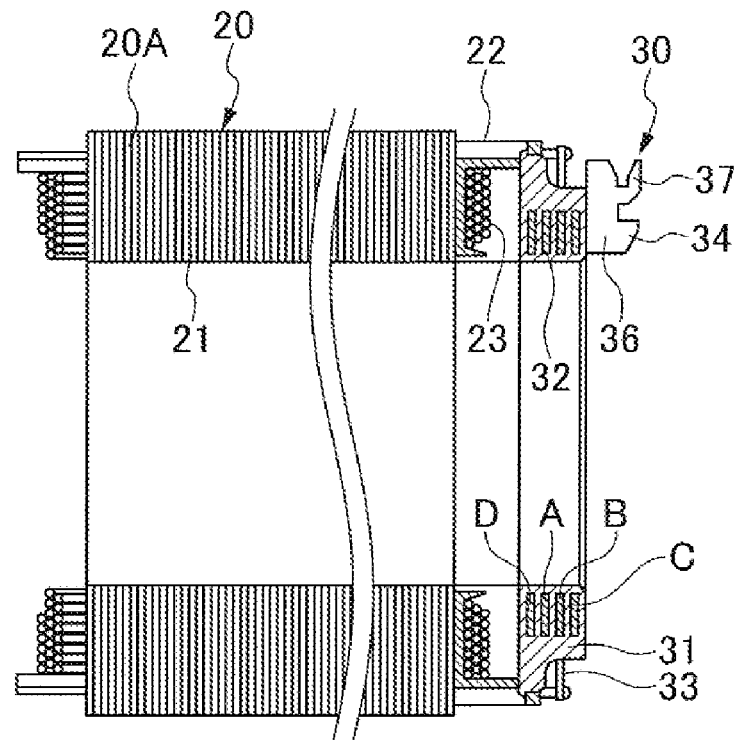
Figure 4B:
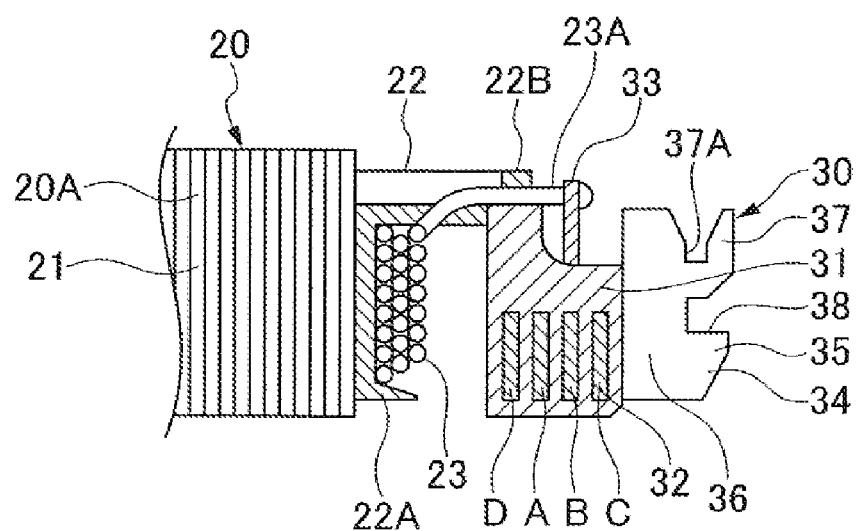
Figure 5A:
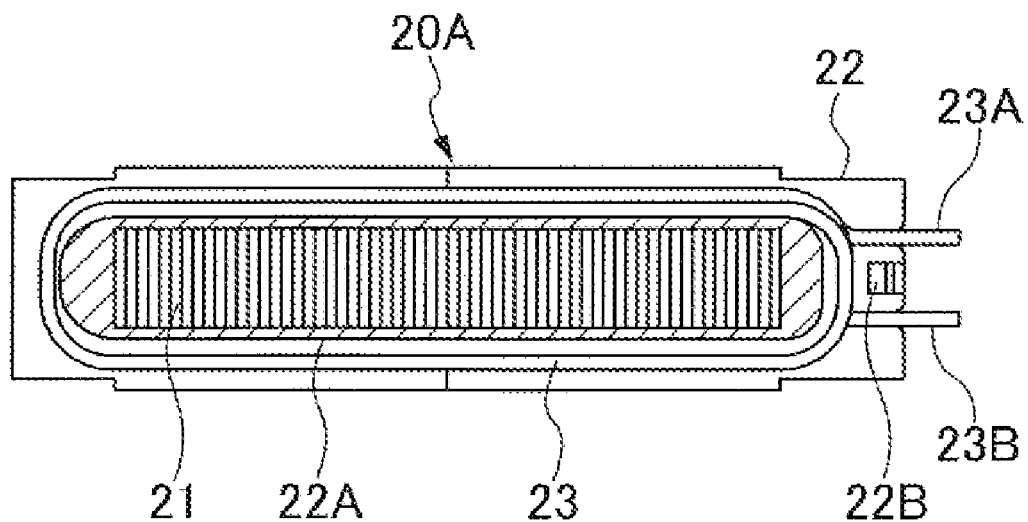
Figure 5B:
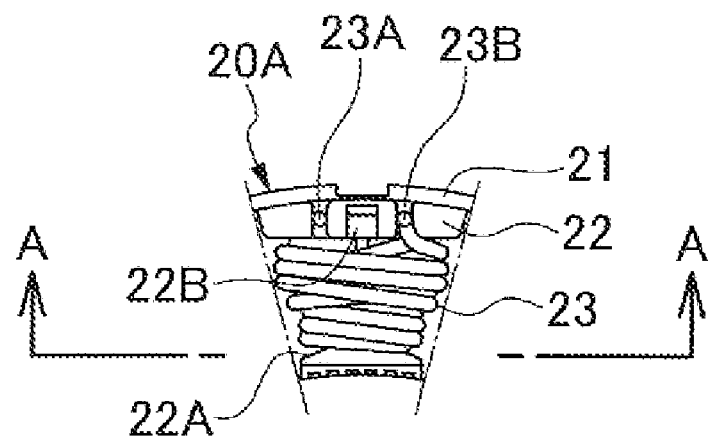

The stator 20 is structured, as shown in FIGS. 4A and 4B, such that a plurality of, for example, four in each of U-phase, V-phase and W-phase (totally twelve) core sub assemblies 20A in the present embodiment, fitted to the inner periphery of the housing 11A are arranged adjacently on a circumference. The core sub assembly 20A is structured by laminating a plurality of cores 21 constituted by silicon steel plates, attaching a resin bobbin 22 to the laminated core 21 and winding respective motor coils 23 forming three phases constituted by the U-phase, the V-phase and the W-phase around a coil winding portion 22A of the resin bobbin 22, as shown in FIGS. 5A and 5B. Each of the motor coils 23 is structured such that both ends constituted by a wind starting end and a wind terminating end are respectively set to a coil terminal 23A and a common terminal 23B, and these terminals 23A and 23B are extended to an outer side from one end side of the coil winding portion 22A of the resin bobbin 22. The resin bobbin 22 is provided with a terminal mounting portion 22B (a concave portion) protruding in an axial direction of the housing 11A along an inner periphery of the housing 11A, in one end side of the coil winding portion 22A (FIG. 2B).

The terminal 30 is attached to the resin bobbin 22 so as to be positioned in a peripheral direction, an axial direction and a diametrical direction by being embedded in a resin portion 31 formed by the resin mold so as to be integrated, in a state in which respective ring main bodies 32 of three bus rings A to C and the neutral bus ring D are arranged in parallel in an axial direction, and locking mounting hooks 31A provided at a plurality of positions in an outer periphery of the resin portion 31 to a concave portion of the terminal mounting portion 22B of the resin bobbin 22, as shown in FIGS. 6A to 6D. The ring main bodies 32 of the bus rings A to C are formed in a C-shaped form so as to be partly cut in the peripheral direction, and the ring main body 32 of the neutral bus ring D is formed in an annular shape continuously formed in the peripheral direction.

Each of the bus rings A to D is connected to the ring main body 32 thereof so as to extend to an outer side in the radial direction of the ring main body 32, and is provided with a terminal portion 33 protruding to an outer portion of the resin portion 31, as shown in FIGS. 7A to 10B. The bus ring A is provided with four terminal portions 33 to which the coil terminals 23A of four U-phase motor coils 23 are connected, in the present embodiment. The bus ring B is provided with four terminal portions 33 to which the coil terminals 23A of four V-phase motor coils 23 are connected, in the present embodiment. The bus ring C is provided with four terminal portions 33 to which the coil terminals 23A of four W-phase motor coils 23 are connected, in the present embodiment. The neutral bus ring D is provided with twelve terminal portions 33 to which the common terminals 23B of twelve motor coils 23 are connected, in the present embodiment. Accordingly, each of the motor coils 23 is star connected by connecting each of the terminal portions 33 connected to the ring main body 32 of each of the bus rings A to C of the terminal 30 and protruding to an outer side in a radial direction from an outer periphery of the resin portion 31 to the coil terminal 23A of each of the U-phase, V-phase and W-phase motor coils 23 of the stator 20, and connecting the terminal portion 33 connected to the ring main body 32 of the neutral bus ring D and protruding from the resin portion 31 to the common terminal 23B of each of the motor coils 23.

Figure 6A:
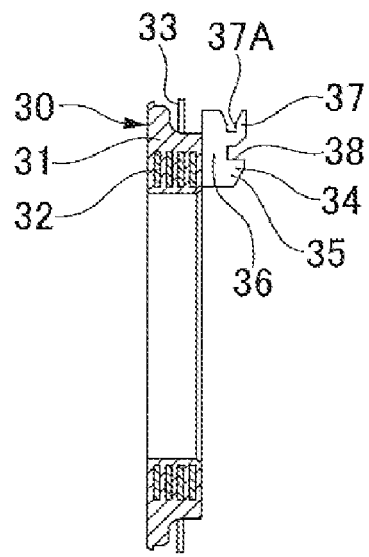
Figure 6B:
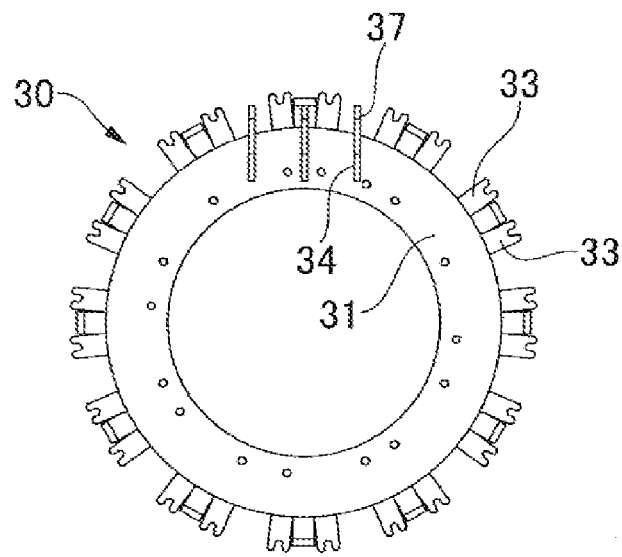
Figure 6C:
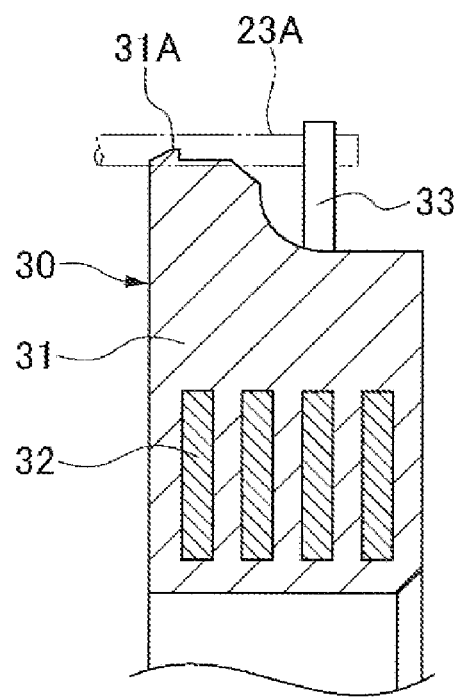
Figure 6D:
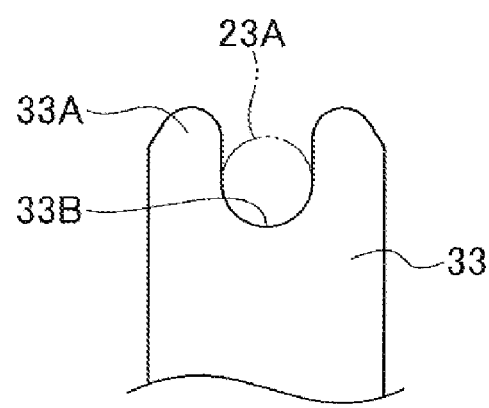
Figure 7A:
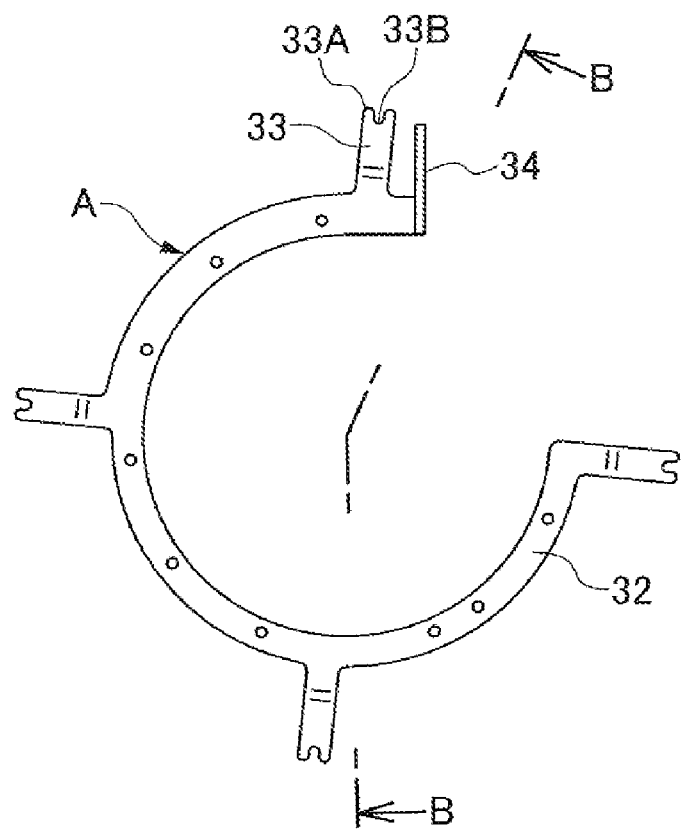
Figure 7B:
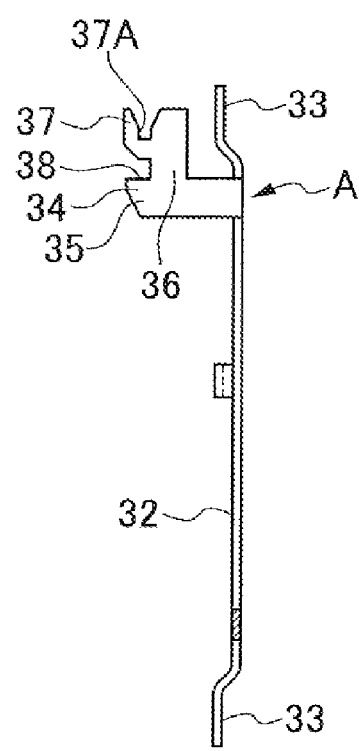
Figure 7C:
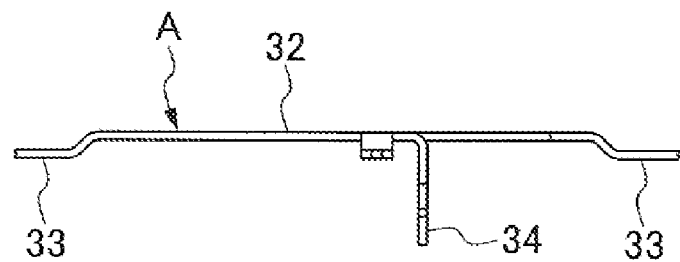
Figure 8A:
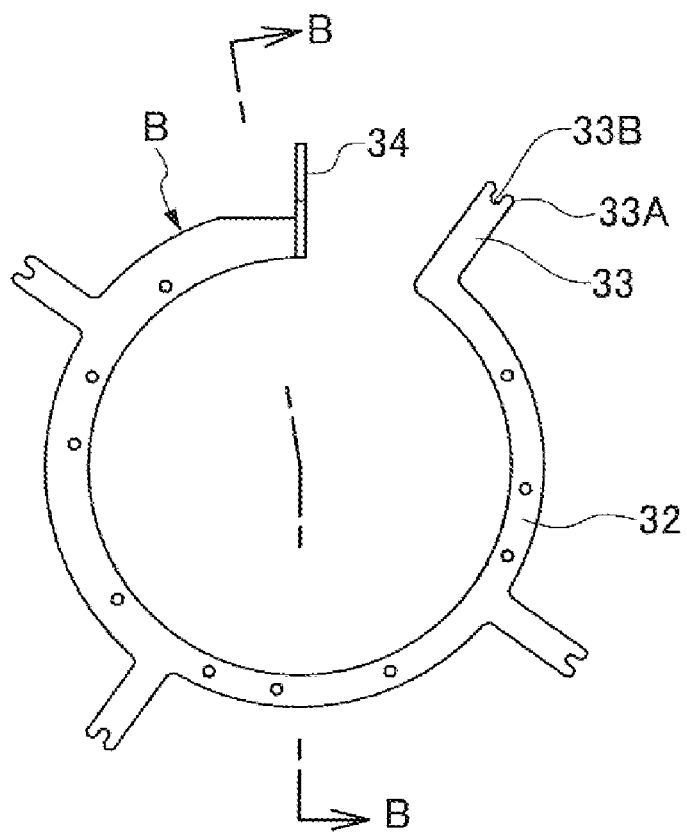
Figure 8B:
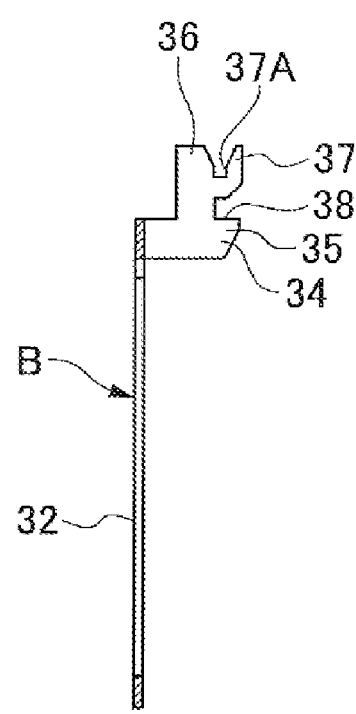
Figure 8C:
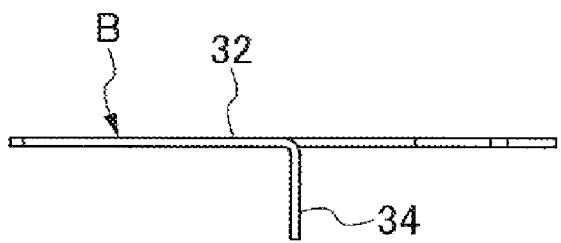
Figure 9A:
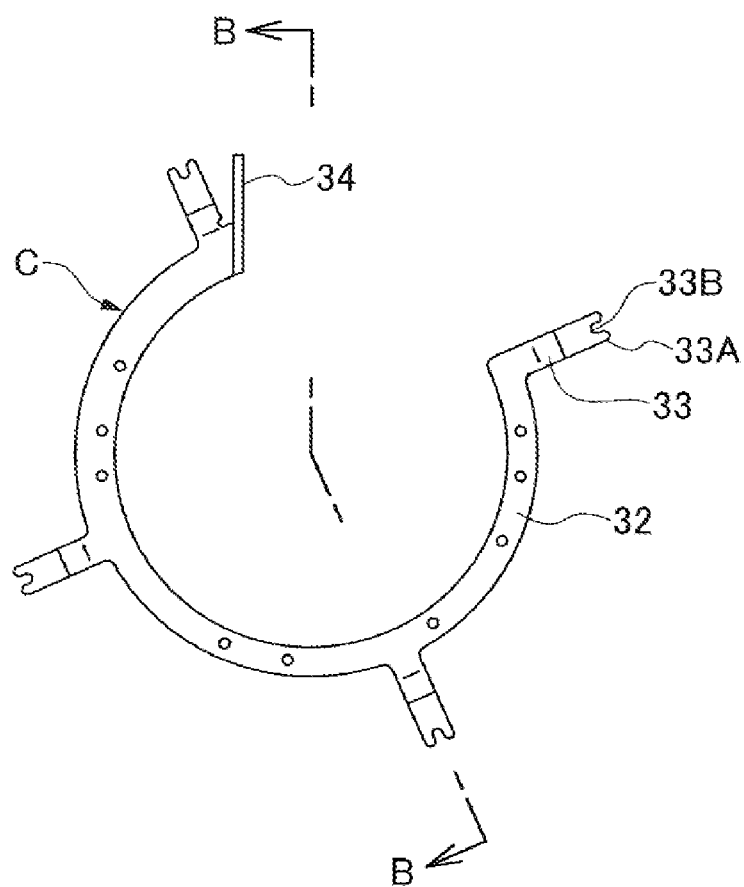
Figure 9B:
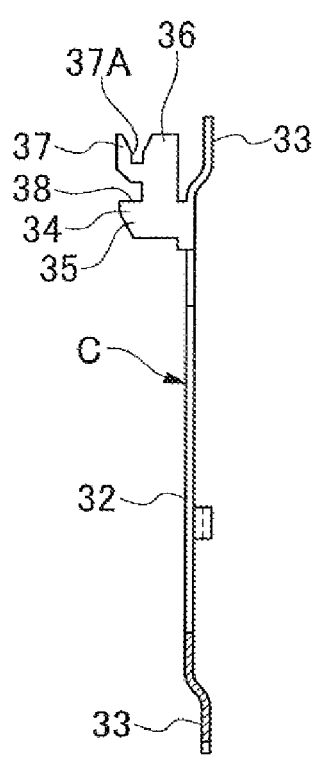
Figure 10A:
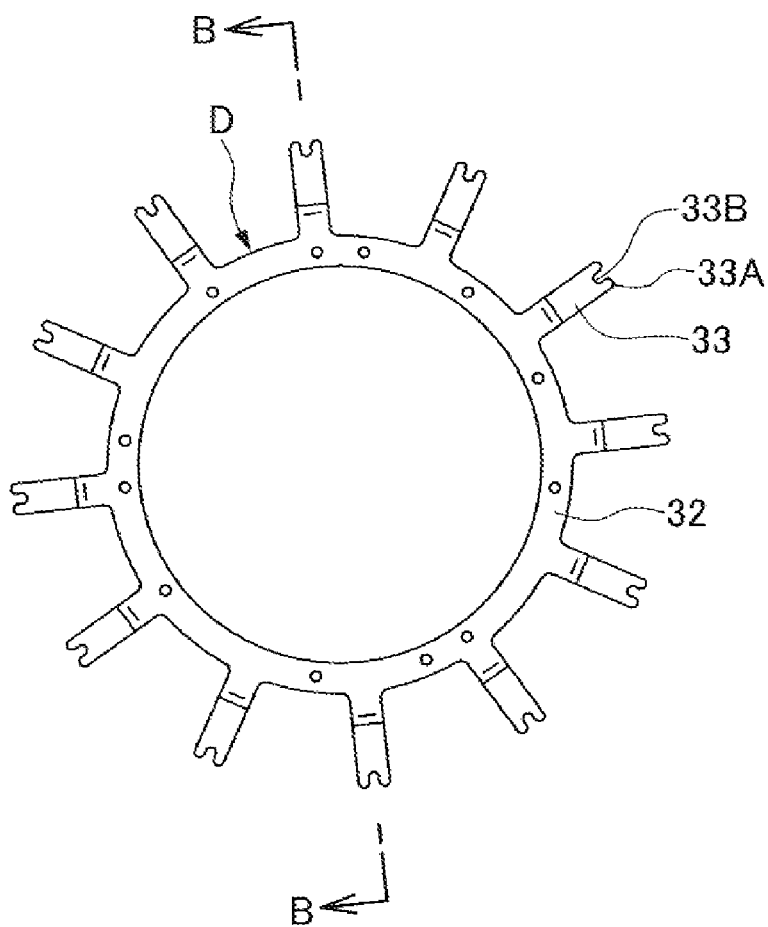
Figure 10B:
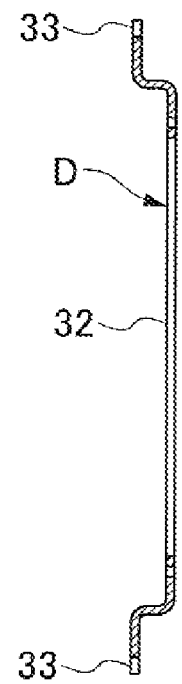

In each of the bus rings A to D, the terminal portion 33 is provided with a leading end concave portion 33B pinched by a leading end hook portion 33A so as to form a U-shaped outline as shown in FIG. 6D. The terminals 23A and 23B of each of the motor coils 23 are assembled in such a manner as to be fitted to the leading end concave portion 33B of the terminal portion 33 of the corresponding bus ring A to D, and are caulked between the leading end hook portions 33A of the terminal portion 33 so as to be welded to the terminal portion 33.

Each of the bus rings A to C is provided with an external portion connecting connection portion 34 connected to the ring main body 32 so as to be bent and stand in a direction along the axial direction of the ring main body 32 from one end in the peripheral direction of the ring main body 32, and protruding to an outer side in an axial direction from the side portion of the resin portion 31, as shown in FIGS. 7A to 9B. In the terminal 30, totally three connection portions 34 of the bus rings A to C are arranged in parallel to each other (FIG. 6B).

Figure 11A:
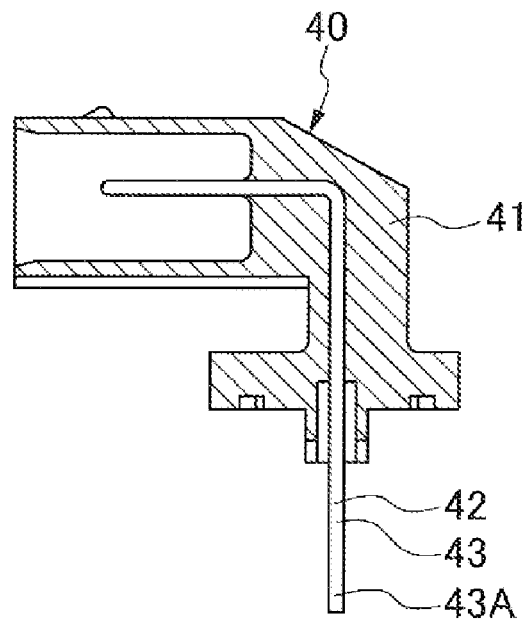
Figure 11B:
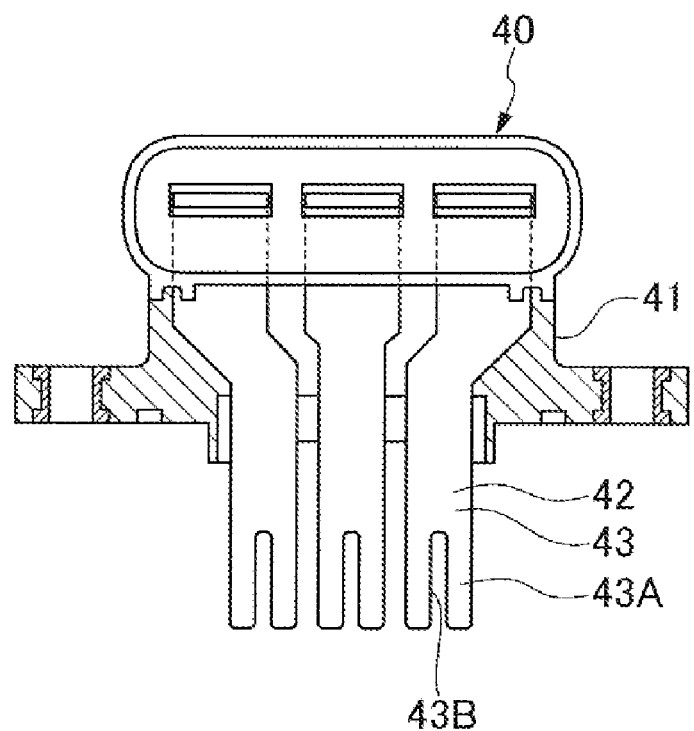

The coupler 40 is structured, as shown in FIGS. 11A and 11B, such that U-phase, V-phase and W-phase connection terminals 42 connected to a control circuit in an external portion are embedded in a resin body 41 screwed into the outer surface of the housing 11A. Each of the U-phase, V-phase and W-phase connection terminals 42 of the coupler 40 is inserted to an inner portion of the housing 11A, and is connected to the connection portion 34 of each of the bus rings A to C of the terminal 30. Each of the connection terminals 42 is inserted to each of the connection portions 34 so as to be mated, and welded, as mentioned below.

The motor 10 has a resolver 50, as shown in FIG. 1, constituted by a resolver rotor portion 51 and a resolver stator portion 52. In other words, the resolver rotor portion 51 rotating together with the rotating shaft 13A is attached to an outer periphery of the rotating shaft 10A of the rotor assembly 13. Further, the resolver stator portion 52 is attached to a side of the stator 20, that is, an inner periphery of the end housing 12. The resolver stator 52 is arranged in such a manner as to surround the resolver rotor portion 51, and detects a rotational position of the rotating shaft 13A on the basis of a change of a reluctance generated with respect to the resolver rotor portion 51 caused by the rotation. A predetermined pattern of current is supplied to each of the U-phase, V-phase and W-phase motor coils 23 of the stator 20 via the coupler 40 and the terminal 30 by the external control circuit in correspondence to the detected rotational position of the rotating shaft 15A, and the drive of the motor 10 is controlled.

Accordingly, in order to improve a bending formability of the bus rings A to C and improve an insert mold formability of the bus ring A to D to the resin portion 31, at a time of constructing the terminal 30, the motor 10 has the following structures.

Figure 12A:
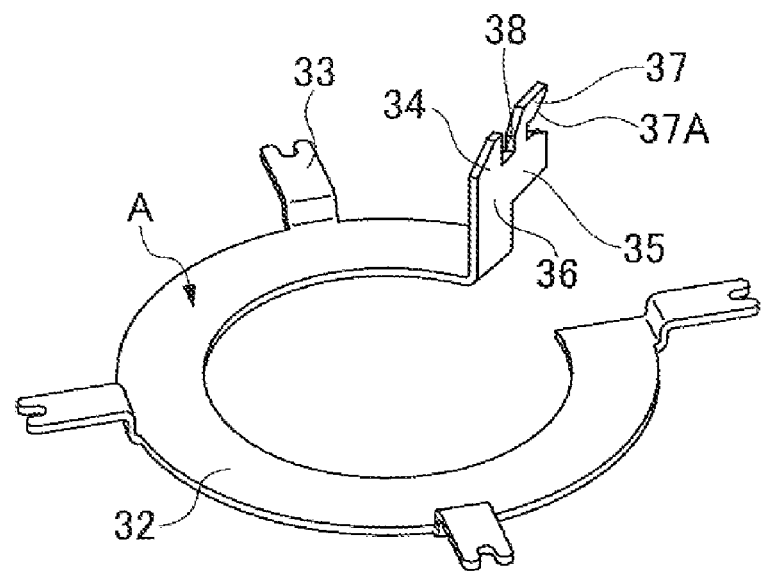
Figure 12B:
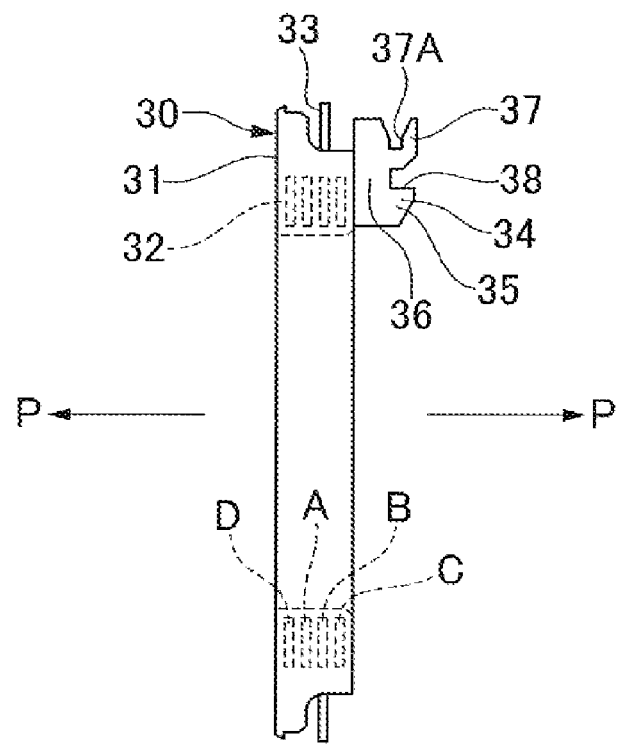
Figure 13A:
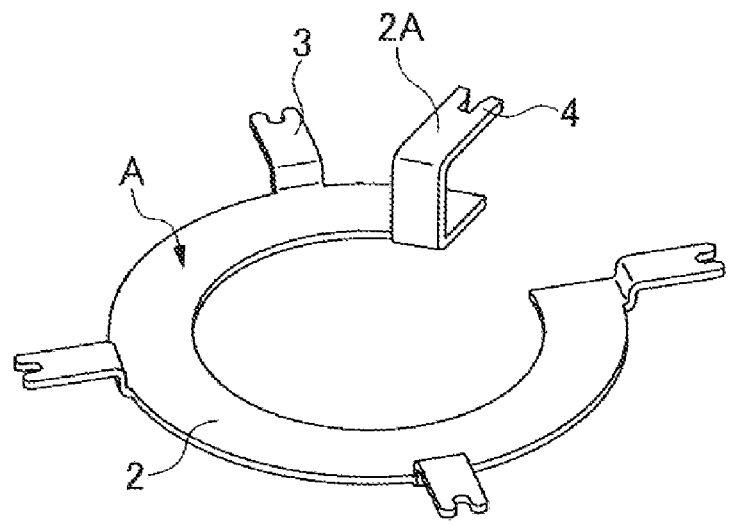
Figure 13B:
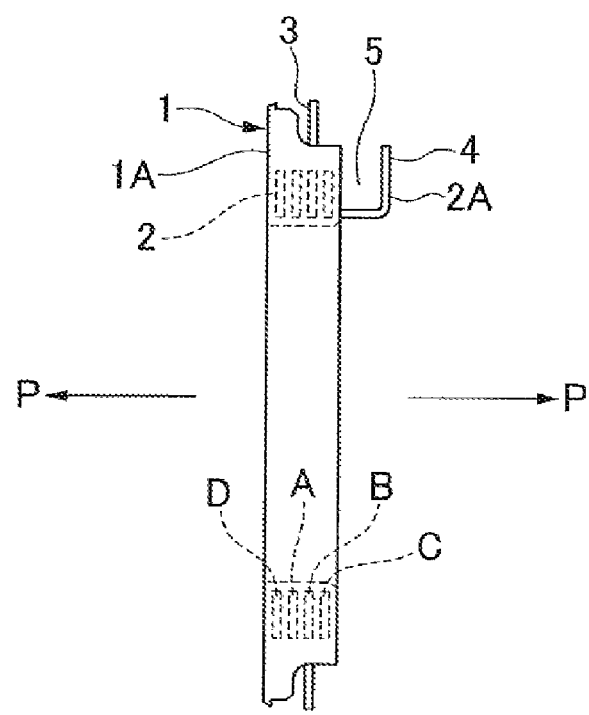

In the terminal 30, each of the bus rings A to C is structured, as shown in FIGS. 12A and 12B (FIG. 12A shows the bus ring A as a representative), such that each of the ring main bodies 32 is formed in a plate shape included in a plane orthogonal to an axial direction thereof (a direction along a center axis of a circular ring of each of the ring main bodies 32), and has a plate-shaped piece 35 bent in a straight shape in a direction along an axial direction from one end in a peripheral direction of each of the ring main bodies 32. Further, the plate-like piece 35 of each of the bus rings A to C is protruded toward all outer side in the axial direction from the resin portion 31, and a leading end side portion of the plate-like piece 35 is formed as a connection portion 34 to each of the connection terminals 42 of the coupler 40.

In FIG. 12B, reference symbol P denotes a dividing direction of the metal mold at a the of forming the resin portion 31 of the terminal 30 by insert molding the bus rings A to D.

In accordance with the present embodiment, the following operations and effects are achieved.

In the terminal 30, the plate-shaped piece 35 forming the connection portion 34 of the coupler 40 to each of the connection terminals 42 and protruding from the resin portion 31 in each of the bus rings A to C is bent in a direction along the axial direction from the ring main body 32 of each of the bus rings A to C.

Accordingly, it is easy to execute the bending work of the bus rings A to C, and it is possible to improve the bending formability. Further, since the plate-shaped piece 35 forming the connection portion 34 of the bus rings A to C extends in parallel in the dividing direction P thereof at a time of insert molding, by inserting each of the bus rings A to D into the metal mold so as to form the resin portion 31, and intending to divide the metal mold along the axial direction, it is not necessary to arrange the slide metal mold orthogonal to the dividing direction P, and the insert molding formability of the bus rings A to D is good.

Further, in order to prevent the resin portion 31 of the terminal 30 from melting due to the heat generation at a time of welding each of the connection terminals 42 of the coupler 40 to the connection portions 34 of a plurality of bus rings A to C resin molded so as to construct the terminal 30, the motor 10 has the following structures.

In the terminal 30, each of the bus rings A to C is provided with a heat radiation portion 36 positioned in an outer side of the resin portion 31 so as to be exposed, between the ring main body 32 molded to the resin portion 31 and the connection portion 34, as shown in FIGS. 2A to 4B. At this time, each of the bus rings A to C has a plate-shaped piece 35 formed by the ring main body 32 in a C-shaped form, bent in a direction along the axial direction of the ring main body 32 from one end in the peripheral direction of each of the ring main bodies 32 so as to stand up, and protruding toward an outer side in the axial direction from the resin portion 31. In the terminal 30, a root side portion with respect to the resin portion 31 of the plate-shaped piece 35 in the plate-shaped piece 35 of each of the bus rings A to C is formed as the heat radiation portion 36 extending in a radial direction of the ring main body 32 so as to be formed long. Further, a leading end side portion of the plate-shaped piece 35, a small piece portion in a leading end lower side protruding from a center side end in the radial direction of the ring main body 32 in the plate-shaped piece 35 toward the outer side in the axial direction of the ring main body 32 is formed as a weld connection portion 134. In this case, the terminal 30 is provided with a positioning portion 37 mentioned below for the connection terminal 42 of the coupler 40, in a leading end upper side of the plate-shaped piece 35.

Accordingly, each of the connection terminals 42 of the coupler 40 is mated with the connection portion 34 protruding to the outer side in the axial direction from the resin portion 31 via the heat radiation portion 36, in each of the bus rings A to C of the terminal 30, and is welded, as shown in FIGS. 2A to 3B.

In accordance with the present embodiment, the following operations and effects can be achieved.

(a) Each of the bus rings A to C of the terminal 30 is provided with the heat radiation portion 36 positioned in the outer side of the resin portion 31, between the ring main body 32 and the connection portion 34. Accordingly, the heat generated at a time of welding each of the connection terminals 42 of the coupler 40 to the connection portion 34 of each of the bus rings A to C is air cooled and radiated by the heat radiation portion 36 positioned in the outer side of the resin portion 31, before being transmitted to the ring main body 32, and is not directly accumulated in the resin portion 31, whereby it is possible to easily prevent the resin portion 31 from melting and being dispersed.

(b) Each of the bus rings A to C of the terminal 30 has the plate-shaped piece 35 connected to the ring main body 32, and protruding in the axial direction from the resin portion 31, the root portion with respect to the resin portion 31 of the plate-shaped piece 35 is formed as the heat radiation portion 36, and the leading end side portion of the plate-shaped piece 35 is formed as the weld connection portion 34. Accordingly, the heat radiation portion 36 positioned in the outer side of the resin portion 31 is set to a plate-shaped area having a great surface area, and it is possible to easily secure the required heat radiating performance.

Next, in order to easily mate each of the connection terminals 42 of the coupler 40 to the connection portion 34 in each of the bus rings A to C of the terminal 30 at the connected position thereof, and intend to stabilize the welding between the both, the motor 10 has the following structures.

In the terminal 30, each of the bus rings A to C is provided with a positioning portion 37 positioning and guiding each of the connection terminals 42 of the coupler 40 to a predetermined connection position to the connection portion 34, in the connection portion 34 thereof as shown in FIGS. 2A to 4B. At this time, each of the bus rings A to C has a plate-shaped piece 35 protruding in the axial direction and forming the connection portion 34 as mentioned above shown in FIGS. 6A to 9B, is provided with the positioning portion 37 near a side of the portion forming the connection portion 34 of the plate-shaped piece 35, that is, ear an upper side with respect to the connection portion 34 via an air gap portion 38, and is provided with a taper-shaped open positioning groove 37A in an upper side (an end surface facing to the coupler 40) of the positioning portion 37. The connection portion 34 and the positioning portion 37 are flush with the heat radiation portion 36 mentioned above. On the other hand, each of the connection terminals 42 of the coupler 40 is formed as a band-plate shaped plate-shaped piece 43 as shown in FIGS. 11A and 11B, and a slit 43B having a fixed length is formed in a bifurcated leading end fork portion 43A formed in a side of the leading end portion of the plate-shaped piece 43.

Accordingly, each of the connection terminals 42 is positioned in three mutually orthogonal directions comprising an axial direction, an axial perpendicular direction and a radial direction of the terminal 30 by fitting the slit 43B of the leading end fork portion 43A in each of the connection terminals 42 of the coupler 40 to a groove bottom portion of the positioning groove 37A provided in the plate-shaped piece 35 in each of the bus rings A to C of the terminal 30. As a result, each of the connection terminals 42 is precisely positioned to a predetermined connection position of the connection portion 34 of each of the bus rings A to C. In the present embodiment, the leading end fork portion 43A of the plate-shaped piece 43 in each of the connection terminals 42 of the coupler 40 forms the air gap portion 38 (serving as the air cooling heat radiation portion of the connection portion 34 to which the leading end fork portion 43A of the connection terminal 42 is welded) among the plate-shaped portion 35 of the positioning portion 37 in each of the bus rings A to C, the positioning portion 37 and the connection portion 34, as shown in FIGS. 2A to 3B, and further pinches the plate-shaped piece 35 of the connection portion 34, and the leading end fork portion 43A of the plate-shaped piece 43 in each of the connection terminals 42 is welded to the plate-shaped piece 35 of the connection portion 34 in each of the bus rings A to C.

In accordance with the present embodiment, the following operations and effects can be achieved.

(a) The positioning portion 37 provided in the connection portion 34 of each of the bus rings A to C positions and guides each of the connection terminals 42 of the coupler 40 to the predetermined connection position between the connection portions 34 of each of the bus rings A to C. Accordingly, it is possible to easily mate the weld portion between each of the connection terminals 42 of the coupler 40 and each of the bus rings to the connection position thereof so as to intend to stabilize the welding between the both, and it is possible to improve an assembling workability and a welding characteristic between the both.

(b) The slit 43B formed in the leading end portion of the plate-shaped connection terminal 42 of the coupler 40 is fitted to the plate-shaped connection portion 34 of each of the bus rings A to C, and the groove bottom portion of the positioning groove 37A provided in the plate-shaped connection portion 34. The connection terminal 42 of the coupler 40 is derived and guided to the positioning groove 37A provided in the connection portion 34 of each of the bus rings A to C so as to be smoothly positioned at the connection position to the connection portion 34.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A terminal for a rotating armature comprising:
   ring main bodies of bus rings (A-C) respectively connected to U-phase, V-phase and W-phase coils of a stator, and a neutral bus ring (D) connected to common terminals of the respective coils, being arranged in parallel in an axial direction thereof to be resin molded in a resin portion,
   a connection portion of the bus rings (A-C) welded to the respective U-phase, V-phase and W-phase connection terminals of a coupler, being protruded from the resin portion,
   each of the bus rings (A-C) formed as a plate shape in which a ring main body of each bus ring is included in a plane orthogonal to the axial direction,
   a plate-shaped piece bent in a direction along the axial direction from one end in a peripheral direction of each of the ring main bodies, and
   the plate-shaped piece of each of the bus rings (A-C) protruding from the resin portion, and
   a leading end side portion of the plate-shaped piece being formed as a connection portion to each of the connection terminals of the coupler,
   wherein the plate-shaped piece is formed by being folded in a straight shape in a direction along the axial direction from one edge end in a peripheral direction of each of the ring main bodies, and the plate-shaped piece protrudes toward an outer side in the axial direction from the resin portion.

2. A terminal for a rotating armature as claimed in claim 1, wherein each of the connection terminals of the coupler is formed as a band-plate shaped plate-shaped piece, and is structured such that a slit having a fixed length is formed in a bifurcated leading end fork portion formed in the leading end portion side of the plate-shaped piece.

3. A terminal for a rotating armature as claimed in claim 1, wherein in the plate-shaped piece of each of the bus rings (A-C), a root side portion with respect to the resin portion of the plate-shaped piece is formed as a heat radiation portion.

4. A terminal for a rotating armature as claimed in claim 3, wherein the heat radiation portion is positioned in an outer side of the resin portion and is exposed to the outer side of the resin portion, between the ring main body molded to resin portion and the connection portion.

5. A terminal for a rotating armature as claimed in claim 1, wherein in the leading end side portion of each of the bus rings (A-C) a leading end lower portion positioned close to a center in a radial direction of each of the ring main bodies is formed as a connection portion to each of the connection terminals of the coupler, and a leading end upper portion positioned close to an outer side in the radial direction of each of the ring main bodies is formed as a positioning portion for each of the connection terminals of the coupler.

6. A terminal for a rotating armature as claimed in claim 5, wherein the connection portion and the positioning portion are flush with the heat radiation portion.

7. A terminal for a rotating armature as claimed in claim 5, wherein each of the connection terminals of the coupler is formed as a band-plate shaped plate-shaped piece, and is structured such that a slit having a fixed length is formed in a bifurcated leading end fork portion formed in the leading end portion side of the plate-shaped piece.

8. A terminal for a rotating armature as claimed in claim 3, wherein in the leading end side portion of each of the bus rings (A-C), a leading end lower portion positioned close to a center in a radial direction of each of the ring main bodies is formed as a connection portion to each of the connection terminals of the coupler, and a leading end upper portion positioned close to an outer side in the radial direction of each of the ring main bodies is formed as a positioning portion for each of the connection terminals of the coupler.

9. A terminal for a rotating armature as claimed in claim 8, wherein the connection portion and the positioning portion are flush with the heat radiation portion.

10. A terminal for a rotating armature as claimed in claim 5, wherein a positioning groove open in a taper shape is provided in an end surface facing to the coupler corresponding to an upper side of the positioning portion.

11. A terminal for a rotating armature as claimed in claim 10, wherein the connection portion and the positioning portion are flush with the heat radiation portion.

12. A terminal for a rotating armature as claimed in claim 10, wherein each of the connection terminals of the coupler is formed as a band-plate shaped plate-shaped piece, and is structured such that a slit having a fixed length is formed in a bifurcated leading end fork portion formed in the leading end portion side of the plate-shaped piece.

13. A terminal for a rotating armature as claimed in claim 8, wherein a positioning groove open in a taper shape is provided in an end surface facing to the coupler corresponding to an upper side of the positioning portion.

14. A terminal for a rotating armature as claimed in claim 13, wherein the connection portion and the positioning portion are flush with the heat radiation portion.

15. A terminal for a rotating armature as claimed in claim 13, wherein each of the connection terminals of the coupler is formed as a band-plate shaped plate-shaped piece, and is structured such that a slit having a fixed length is formed in a bifurcated leading end fork portion formed in the leading end portion side of the plate-shaped piece.

* * * * *